United States Patent
Yoda

(10) Patent No.: US 10,613,460 B2
(45) Date of Patent: Apr. 7, 2020

(54) IMAGE FORMING APPARATUS HAVING A NORMAL MODE AND A POWER SAVING MODE

(71) Applicant: KYOCERA Document Solutions Inc., Osaka (JP)

(72) Inventor: Junya Yoda, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/099,603

(22) PCT Filed: Oct. 12, 2017

(86) PCT No.: PCT/JP2017/036984
§ 371 (c)(1),
(2) Date: Nov. 7, 2018

(87) PCT Pub. No.: WO2018/079281
PCT Pub. Date: May 3, 2018

(65) Prior Publication Data
US 2019/0129339 A1 May 2, 2019

(30) Foreign Application Priority Data
Oct. 24, 2016 (JP) .................. 2016-207816

(51) Int. Cl.
*G06K 15/00* (2006.01)
*G03G 15/00* (2006.01)
(Continued)

(52) U.S. Cl.
CPC .......... *G03G 15/5004* (2013.01); *B41J 29/38* (2013.01); *G03G 15/55* (2013.01); *G03G 15/60* (2013.01); *G06F 1/26* (2013.01); *G06F 1/3203* (2013.01); *G06F 1/3206* (2013.01); *G06F 1/3284* (2013.01); *G06F 1/3287* (2013.01);
(Continued)

(58) Field of Classification Search
CPC .... G03G 15/5004; G03G 15/55; G03G 15/60; B41J 29/38; G06F 1/26; G06F 1/3206; G06F 1/3284; G06F 1/3287; G06F 3/1221; G06K 15/4055; G06K 15/406; H04N 1/00; H04N 1/00687; H04N 1/00689;
(Continued)

(56) References Cited

U.S. PATENT DOCUMENTS

2013/0215481 A1* 8/2013 Hayasaka ............ G03G 15/607
358/498

FOREIGN PATENT DOCUMENTS

JP 2008-278107 A 11/2008

* cited by examiner

*Primary Examiner* — Moustapha Diaby
(74) *Attorney, Agent, or Firm* — Stein IP, LLC

(57) ABSTRACT

An image forming apparatus has a power supply portion, an operation panel, a document set portion, a plurality of sensing portions including a document set sensing portion that outputs a document set signal at a first level if the document is set, and control portions. The control portions, at transition to the power saving mode, stores flag data if the document set signal is at the first level, and when the level of any of the status signals from the plurality of sensing portions changes while in the power saving mode, even if the level of the document set signal is the first level, if the flag data is stored, the control portion maintains the electric power supply to the operation panel as the electric power supply expected in the power saving mode.

5 Claims, 3 Drawing Sheets

(51) Int. Cl.
*B41J 29/38* (2006.01)
*H04N 1/00* (2006.01)
*G06F 1/3203* (2019.01)
*G06F 1/3206* (2019.01)
*G06F 1/3234* (2019.01)
*G06F 1/3287* (2019.01)
*H04N 1/04* (2006.01)
*G06F 1/26* (2006.01)

(52) U.S. Cl.
CPC ....... *G06K 15/406* (2013.01); *G06K 15/4055* (2013.01); *H04N 1/00* (2013.01); *H04N 1/00687* (2013.01); *H04N 1/00694* (2013.01); *H04N 1/00896* (2013.01); *H04N 1/04* (2013.01); *H04N 1/00891* (2013.01)

(58) Field of Classification Search
CPC ........... H04N 1/00692; H04N 1/00694; H04N 1/00896; H04N 1/00891; H04N 1/04
See application file for complete search history.

IMAGE FORMING APPARATUS HAVING A NORMAL MODE AND A POWER SAVING MODE

CROSS-REFERENCE TO RELATED APPLICATIONS

This application is a national stage of International Application No. PCT/JP2017/036984, filed Oct. 12, 2017, which claims the benefit of priority to Japanese Application No. 2016-207816, filed Oct. 24, 2016, in the Japanese Patent Office, the disclosures of which are incorporated herein by reference.

TECHNICAL FIELD

The present invention relates to an image forming apparatus provided with an operation panel.

BACKGROUND ART

Conventionally, there are known image forming apparatuses that have, as a power supply mode, a normal mode and a power saving mode in which electric power consumption is suppressed compared to in the normal mode. A conventional image forming apparatus is provided with a plurality of sensing portions that change levels of output signals according to the status of the image forming apparatus. For example, the sensing portions provided in the image forming apparatus include a document set sensing portion of which the level of the output signal changes when a document to be read is set on the image forming apparatus, a cassette sensing portion of which the level of the output signal changes when the sheet cassette of the image forming apparatus is attached or detached, and a cover sensing portion of which the level of the output signal changes when the cover that is openably and closably fitted to the image forming apparatus is opened or closed.

The conventional image forming apparatus returns to the normal mode, for example, when the level of the output signal of the document set sensing portion changes during the period of the power saving mode. Here, an operation panel of the image forming apparatus shows a setting screen for accepting settings related to a job (for example, see Patent Document 1). With this, when a user tries to execute a job involving document reading (such as a copy job), even if the image forming apparatus is in the power saving mode, simply setting a document on the image forming apparatus causes the image forming apparatus to return to the normal mode (causes the setting screen to be displayed on the operation panel), and this is convenient for the user.

LIST OF CITATIONS

Patent Literature

Patent Document 1: JP-A-2008-278107

SUMMARY OF THE INVENTION

Problem to be Solved by the Invention

For example, a control portion (CPU) in the image forming apparatus configured as described above is, during the period of the power saving mode, in a power saving state where it performs only sensing of changes in the levels of different output signals of the plurality of sensing portions, and when the level of any of the output signals of the plurality of sensing portions changes, the image forming apparatus returns from the power saving state to a normal state. Here, if the level of the output signal of the document set sensing portion out of the plurality of the sensing portions is a predetermined level indicating that a document is set on the image forming apparatus, the control portion makes the image forming apparatus shift to the normal mode (displays a setting screen on the operation panel). On the other hand, if the output signal of the document set sensing portion is not the predetermined level (when the image forming apparatus has returned to the normal state as a result of a change in the level of the output signal of a sensing portion other than the document set sensing portion), the control portion only performs prescribed processing without making the image forming apparatus return to the normal mode (the setting screen is not displayed on the operation panel). Then, when the processing is completed, the control portion returns to the power saving state.

Here, in the configuration described above, if the image forming apparatus shifts to the power saving mode with a document set on the image forming apparatus (if a document inadvertently left-behind is set on the image forming apparatus), the following inconvenience occurs.

For example, assume that, after the image forming apparatus on which a left behind document is set shifts to the power saving mode, a user attaches or detaches the sheet cassette of the image forming apparatus in the power saving mode. In this case, the level of the output signal of the cassette sensing portion out of the plurality of sensing portions changes, and so the control portion returns to the normal mode. Here, a left-behind document is set on the image forming apparatus (the level of the output signal of the document set sensing portion is the predetermined level), and thus the control portion makes the image forming apparatus return to the normal mode. Thus, even though a user who has attached or detached the cassette in the power saving mode does not intend to execute a job, the setting screen is unnecessarily displayed on the operation panel.

The present invention has been made to solve the above problem and its object is to provide an image forming apparatus that can prevent unnecessary display on the operation panel.

Means for Solving the Problem

To achieve the above object, the image forming apparatus according to the present invention has a normal mode and a power saving mode for suppressing electric power consumption compared to in the normal mode, executes a job during the normal mode, and comprises a power supply portion for supplying electric power, an operation panel which, in the normal mode, displays a screen related to the job and accepts operation from a user and which, in the power saving mode, stops displaying the screen by being supplied from the power supply portion with suppressed electric power compared to in the normal mode, a document set portion on which a document is set if the job is a job involving document reading, a plurality of sensing portions which respectively output status signals that are signals with levels corresponding to status of the image forming apparatus, the plurality of sensing portions including a document set sensing portion which outputs, as the status signal, a document set signal whose signal level is the first level if a document is set on the document set portion and whose signal level is the second level if a document is not set on the document set portion, a control portion which controls the power supply portion and which senses the levels of the status signals, and a storing portion which stores data. The control portion shifts the image forming apparatus to the power saving mode irrespective of the level of the document set signal when a shift condition prescribed as a condition for shifting the image forming apparatus to the power saving mode is met during the period of the normal mode. When shifting the image forming apparatus to the power saving mode, the control portion stores in the storing portion flag data indicating that a document is set on the document set portion if the level of the document set signal is the first level but does not store flag data in the storing portion if the level of the document set signal is the second level. When the level of any of the status signals from the plurality of sensing portions changes during the period of the power saving mode, if the level of the document set signal is the first level and flag data is not stored in the storing portion, the control portion switches the electric power supply from the power supply portion to the operation panel to the electric power supply expected in the normal mode and, even if the level of the document set signal is the first level, if flag data is stored in the storing portion, the control portion maintains the electric power supply from the power supply portion to the operation panel as the electric power supply expected in the power saving mode.

In the configuration according to the present invention, as described above, when shifting the image forming apparatus to the power saving mode, the control portion stores in the storing portion flag data indicating that a document is set on the document set portion if the level of the document set signal is the first level (if a left-behind document is set on the document set portion) but does not store flag data in the storing portion if the level of the document set signal is the second level (if a left-behind document is not set on the document set portion).

When any of the status signals from the plurality of sensing portions changes during the period of the power saving mode, if the level of the document set signal is the first level and flag data is not stored in the storing portion, the control portion switches the electric power supply from the power supply portion to the operation panel to the electric power supply expected in the normal mode and, even if the level of the document set signal is the first level, if flag data is stored in storing portion, the control portion maintains the electric power supply from the power supply portion to the operation panel as the electric power supply expected in the power saving mode.

For example, assume the image forming apparatus shifts to the power saving mode with a left-behind document set on the document set portion (at this time, flag data is stored in the storing portion), and then a user performs such a task with respect to the image forming apparatus as to change the level of a status signal of the sensing portion other than the document set sensing portion out of the plurality of sensing portions. Here, due to the left-behind document being set on the document set portion, the level of the document set signal is the first level. However, flag data is stored in the storing portion and thus the electric power supply from the power supply portion to the operation panel is maintained as the electric power supply expected in the power saving mode (the operation panel does not display a screen). With this, it is possible to prevent the inconvenience where, when a user performs a task with respect to the image forming apparatus during the period of the power saving mode, a screen related to a job is unnecessarily displayed on the operation panel due to a left-behind document being set on the document set portion even though the user does not intend to execute the job.

If the image forming apparatus shifts to the power saving mode with a left-behind document not set on the document set portion (at this time, flag data is not stored in the storing portion) and then a user performs a task of setting a document on the document set portion intending to execute a job, with this task acting as a trigger, a screen for accepting operation related to the job is displayed on the operation panel. Thus, the user has only to set a document on the document set portion to immediately perform operation on the screen related to the job (without separately performing a task for displaying the screen related to the job on the operation panel), and this is convenient for the user.

Advantageous Effects of the Invention

The configuration according to the present invention can prevent unnecessary display on an operation panel.

DESCRIPTION OF EMBODIMENTS

<The Structure of a Multifunction Peripheral>

Figure 1:
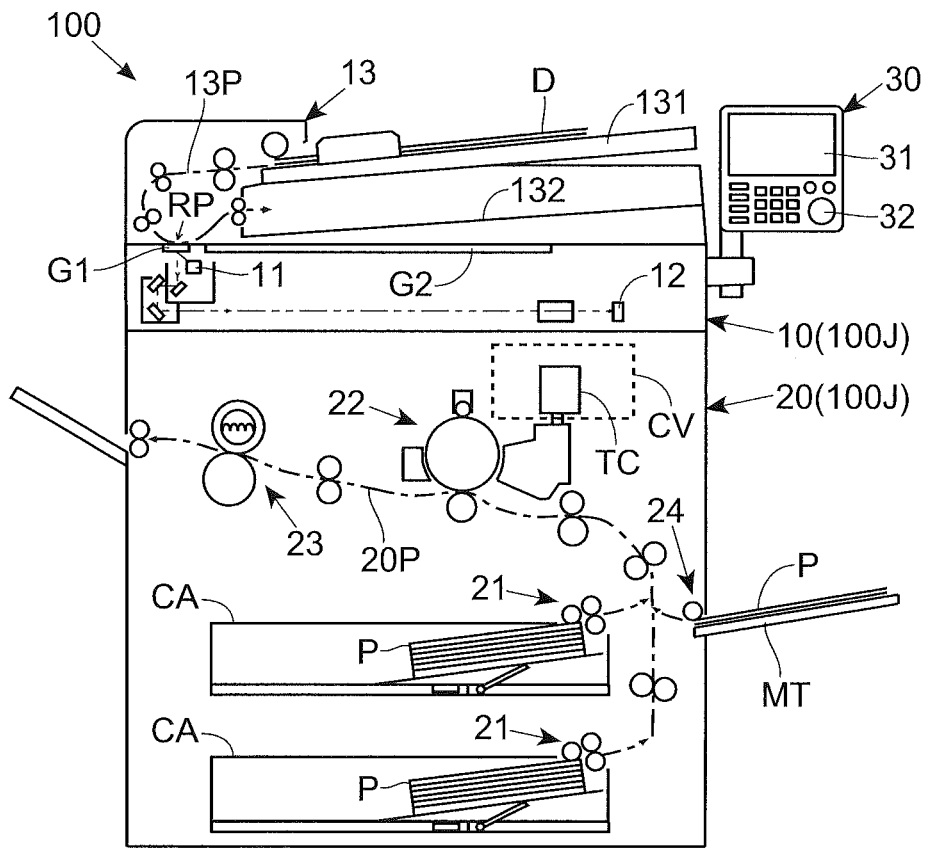
FIG. 1 A diagram showing an overall construction of a multifunction peripheral according to one embodiment of the present invention.

As shown in FIG. 1, a multifunction peripheral 100 according to this embodiment is provided with an image reading portion 10 and a printing portion 20. The image reading portion 10 is a job executing portion for reading a document D and generating its image data when a job involving document D reading is executed. The printing portion 20 is a job executing portion for forming an image and printing it on a sheet P when a job involving image printing on the sheet P is executed. In the following description, the image reading portion 10 and the printing portion 20 may be referred to as a job executing portion 100J.

The image reading portion 10 includes optical members such as a lamp 11 and an image sensor 12 and optically reads the document D. The optical members such as the lamp 11 and the image sensor 12 are housed inside a housing of the image reading portion 10 (a reading housing). Contact glasses G1 and G2 are fitted in the top face of the reading housing. The contact glass G1 is a contact glass for conveyed-document reading, and the contact glass G2 is a contact glass for placed-document reading.

The image reading portion 10 includes a document conveying unit 13. The document conveying unit 13 is supported such that it can be opened and closed relative to the top face of the reading housing. The document conveying unit 13 is provided with a document conveying passage 13P, a document set tray 131, and a document discharge tray 132. The document set tray 131 corresponds to a "document set portion".

The document conveying passage 13P extends from the document set tray 131 to the document discharge tray 132 via a predetermined position (the reading position RP for conveyed-document reading) on the contact glass G1. The document conveying unit 13 feeds the document D set on the document set tray 131 to the document conveying passage 13P, conveys the document D along the document conveying passage 13P, and discharges the document D to the document discharge tray 132.

In conveyed-document reading, a user sets a document D on the document set tray 131. The document conveying unit 13 feeds the document D on the document set tray 131 to the document conveying passage 13P, and coveys the document D along the document conveying passage 13P. With this, the document D passes the reading position RP on the contact glass G1. Meanwhile, the image reading portion 10 reads the document D passing the reading position RP and generates image data of the read document D.

In placed-document reading, a user places a document D on the contact glass G2. Then, the image reading portion 10 reads the document D placed on the contact glass G2 and generates image data of the read document D. Here, the document D placed on the contact glass G2 can be pressed against it by the document conveying unit 13.

The printing portion 20 conveys a sheet P along a sheet conveying passage 20P. The printing portion 20 forms a toner image based on image data of an image to be printed (for example, the image data of the document D obtained through document D reading by the image reading portion 10). Then, the printing portion 20 prints the toner image on the sheet P being conveyed. The printing portion 20 includes, for example, a sheet feeding portion 21, an image forming portion 22, and a fixing portion 23.

The sheet feeding portion 21 feeds a sheet P stored in a sheet cassette CA to the sheet conveying passage 20P. The sheet cassette CA is arranged so as to be removable from the multifunction peripheral 100. The sheet cassette CA is pulled out from the multifunction peripheral 100 when sheets P are supplied to the sheet cassette CA. After sheets P are supplied to the sheet cassette CA, the sheet cassette CA is fitted back to the multifunction peripheral 100.

The image forming portion 22 forms a toner image and transfers the toner image to a sheet P. The image forming portion 22 is supplied with toner from a toner container TC, and forms a toner image using the toner. The fixing portion 23 fixes to the sheet P the toner image transferred to the sheet P.

The printing portion 20 includes a manual sheet feeding portion 24. The manual sheet feeding portion 24 feeds a sheet P placed on a manual feed tray MT to the sheet conveying passage 20P.

A part of an exterior cover of the multifunction peripheral 100 is an access cover CV. For example, opening the access cover CV exposes the fitting space for the toner container TC, allowing the toner container TC to be replaced.

The multifunction peripheral 100 is provided with an operation panel 30. The operation panel 30 includes a touch panel display 31. The touch panel display 31 displays a screen with software keys and the like, and accepts touch operation by a user on the displayed screen (software keys). The operation panel 30 is provided with a plurality of hardware keys 32 such as a Start key to receive from a user an instruction to execute a job.

Figure 2:
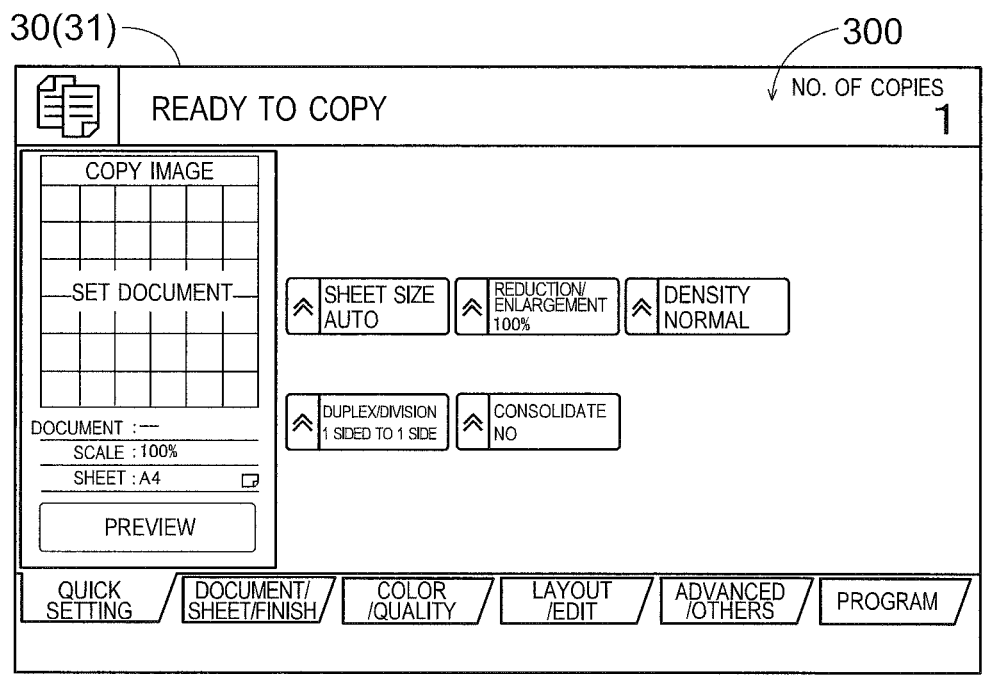
FIG. 2 A diagram showing one example of a screen displayed on the multifunction peripheral according to the one embodiment of the present invention.

For example, the operation panel 30 displays a setting screen 300 as shown in FIG. 2. The setting screen 300 is a screen for accepting from a user settings related to a job. As an example, FIG. 2 shows a copy screen displayed when the job to be executed is a copy job. In the copy screen, values for setting items related to the copy job, such as sheet size and density, can be set.

Figure 3:
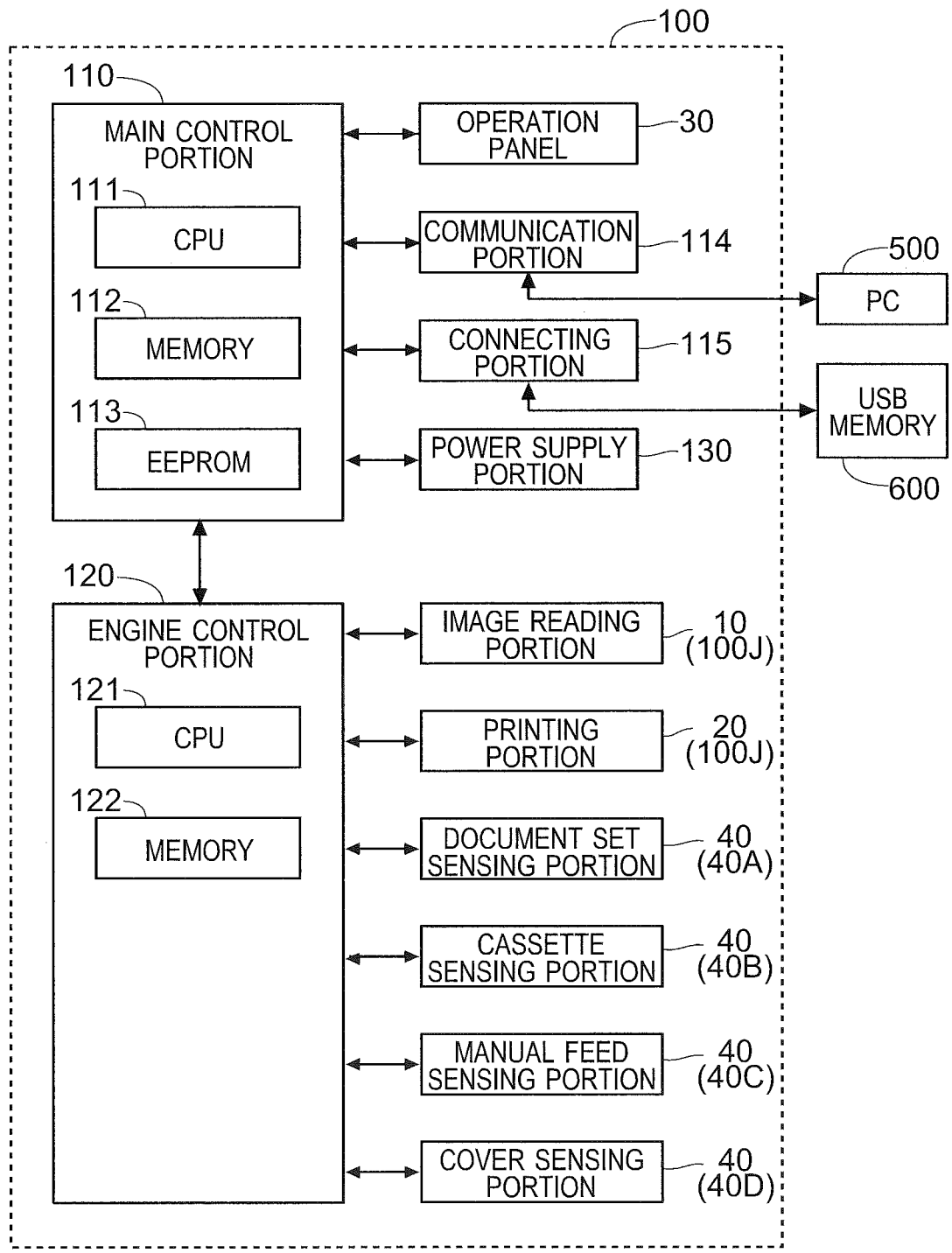
FIG. 3 A diagram showing a hardware configuration of the multifunction peripheral according to the one embodiment of the pr-sent invention.

As shown in FIG. 3, the multifunction peripheral 100 is provided with a main control portion 110 and an engine control portion 120. The main control portion 110 corresponds to a "first control portion", and the engine control portion 120 corresponds to a "second control portion".

The main control portion 110 includes a CPU 111 and a memory 112 (such as ROM and RAM). The CPU 111 operates based on a control program and data stored in the memory 112. Here, the main control portion 110 includes an EEPROM 113 that stores various data in a non-volatile manner. For example, the EEPROM 113 stores flag data, which will be described later. That is, the EEPROM 113 corresponds to a "storage portion". The flag data will be explained in detail later.

The main control portion 110 is connected to the operation panel 30, and controls display operation of the operation panel 30 as well as senses operation performed on the operation panel 30. When the main control portion 110 senses that operation has been performed on the operation panel 30, it displays on the operation panel 30 a screen corresponding to the sensed operation.

The main control portion 110 is connected to a communication portion 114. The communication portion 114 is a network interface for connecting a personal computer (PC) 500 to the multifunction peripheral 100 via a network such as a LAN. The communication portion 114 corresponds to an "input portion", and the PC 500 corresponds to an "external device".

The main control portion 110 senses whether the communication portion 114 receives a communication request from the PC 500. Upon sensing the reception of the communication request from the PC 500, the main control portion 110 communicates with the PC 500 via the communication portion 114. In this communication, when the communication portion 114 receives job data of a printing job (data including image data of an image to be printed, conditions for job execution, and a job request that requests job execution) from the PC 500, the main control portion 110 judges that it has received a job request, and performs processing for executing the job. The main control portion 110 performs processing such as image processing on image data included in job data and processing for transferring image data having undergone image processing to the engine control portion 120.

The main control portion 110 is connected to a connecting portion 115. The connecting portion 115 is a USB interface for connecting a USB memory 600 to the multifunction peripheral 100. The connecting portion 115 corresponds to an "input portion", and the USB memory 600 corresponds to an "external device".

The main control portion 110 senses whether the USB memory 600 is connected to the connecting portion 115. Upon sensing the connection with the USB memory 500, the main control portion 110 checks data stored in the USB memory 600. Then, if job data for a direct printing job (job of printing on a sheet P an image based on image data stored in the USB memory 600) is stored in the USB memory 600, the main control portion 110 judges that it has received a job request, and performs processing for executing the direct printing job. The main control portion 110 performs processing such as processing for transferring image data stored in the USB memory 600 to the memory 112, image processing on the image data, and processing for transferring image data having undergone image processing to the engine control portion 120.

The engine control portion 120 includes a CPU 121 and a memory 122 (such as ROM and RAM). The CPU 121 operates based on a control program and data stored in the memory 122.

The engine control portion 120 is connected to the image reading portion 10, and controls reading operation of the image reading portion 10. The engine control portion 120 is connected to the printing portion 20 and controls printing operation of the printing portion 20.

Here, the multifunction peripheral 100 is provided with a plurality of sensing portions 40 for sensing the status of the multifunction peripheral 100. The plurality of sensing portions 40 are connected to the engine control portion 120, and each outputs a status signal with a level corresponding to the status of the multifunction peripheral 100 to the engine control portion 120. The engine control portion 120 senses the levels of the status signals (whether they are at H or L level) output from the plurality of sensing portions 40. In other words, the engine control portion 120 senses the status of the multifunction peripheral 100 based on the status signals from the plurality of sensing portions 40.

A sensing portion 40A changes the level of the status signal according to whether a document D is set on the document set tray 131 or not. In the following description, the sensing portion 40A may be referred to as a document set sensing portion 40A, and a status signal output from the document set sensing portion 40A may be referred to as a document set signal.

The document set sensing portion 40A includes a transmissive optical sensor for sensing an actuator (unillustrated) fitted to the document set tray 131. When a document D is set on the document set tray 131, the actuator moves downward by being pressed down by the document D and blocks (or opens) the optical path of the optical sensor. When the document D is removed from the document set tray 131, the actuator moves upward by being released from the pressure of the document D and blocks (or opens) the optical path of the optical sensor.

That is, the document set sensing portion 40A changes the level of the document set signal depending on whether the document D is set on the document set tray 131 or not. In the following description, the level of the document set signal when the document D is set on the document set tray 131 is referred to as a first level, and the level of the document set signal when the document D is not set on the document set tray 131 is referred to as a second level.

A sensing portion 40B (cassette sensing portion) changes the level of the status signal according to whether the sheet cassette CV is fitted to the multifunction peripheral 100 or not. A sensing portion 40C (manual feed sensing portion) changes the level of the status signal according to whether a sheet P is placed on the manual feed tray MT or not. The sensing portion 40D (cover sending portion) changes the level of the status signal according to whether the access cover CV is open or not.

The multifunction peripheral 100 is provided with a power supply portion 130. The power supply portion 130 includes, among others, a power supply circuit for generating voltages and a power supply control circuit for controlling the supply of electric power. The power supply portion 130 generates voltages for operating different parts of the multifunction peripheral 100 such as the image reading portion 10, the printing portion 20, the operation panel 30, the main control portion 110, and the engine control portion 120. The power supply portion 130 is connected to the main control portion 110, and upon receiving an instruction from the main control portion 110, switches power supply modes.

<The Normal Mode and the Power Saving Mode>

The multifunction peripheral 100 has a normal mode and a power saving mode (sleep mode) as power supply modes. The normal mode is a mode where the power supply portion 130 supplies power normally. The power saving mode is a mode in which the supply of power by the power supply portion 130 is limited compared to in the normal mode (a mode in which electric power consumption is suppressed).

The main control portion 110 judges, during the period of the normal mode, whether a shift condition that is previously determined as a condition for shifting the multifunction peripheral 100 from the normal mode to the power saving mode is met or not. When the shift condition is met, the main control portion 110 instructs the power supply portion 130 to shift the multifunction peripheral 100 from the normal mode to the power saving mode. For example, the main control portion 110 measures an unused time, which is the time elapsed while the multifunction peripheral 100 is unused, and when the unused time exceeds a predetermined threshold time, the main control portion 110 judges that the shift condition is met.

A hardware key 32 (power saving key) for receiving from a user an instruction to shift from the normal mode to the power saving mode may be provided on the operation panel 30. In that case, if the main control portion 110 senses operation of the power saving key on the operation panel 30 during the period of the normal mode, the main control portion 110 judges that the shift condition is met.

The power supply portion 130, in the normal mode, supplies power to the job executing portion 100J normally and brings the job executing portion 100J into a job-executable state. On the other hand, the power supply portion 130, during the power saving mode, limits the electric power supplied to the job executing portion 100J compared to in the normal mode (for example, stops supplying power to the job executing portion 100J). Thus, the job executing portion 100J, in the power saving mode, goes into a job non-executable state.

The power supply portion 130, in the normal mode, supplies power to the operation panel 30 normally. Here, the operation panel 30 displays a screen such as the setting screen 300 and accepts operation from a user. On the other hand, the power supply portion 130, in the power saving mode, limits the power supplied to the operation panel 30 compared to in the normal mode (stops part of power supply to the operation panel 30). For example, the power supply portion 130 stops power supply to the display panel (backlight) of the touch panel display 31. Thus, in the power saving mode, the operation panel 30 stops displaying the screen, and in that state, accepts operation from a user. When the operation panel 30 is not displaying the screen, setting related to a job cannot be performed.

<Operation of Control Portions in the Power Saving Mode>

The power supply portion 130, in the power saving mode, limits the electric power supplied to the main control portion 110 compared to in the normal mode (the supply of electric power to the main control portion 110 is not completely stopped). Here, the main control portion 110 does not perform arithmetic processing or the like and goes into a power saving state where it takes in only signals input to part of the terminals (interruption ports) of the CPU 111.

To the interruption ports of CPU 111 are input, among others, an operation signal of which the signal level changes when the operation panel 30 is operated, a reception signal of which the signal level changes when the communication portion 114 receives a communication request from the PC 500, and a connection signal of which the signal level changes when the USB memory 600 is connected to the connecting portion 115. Thus, the main control portion 110 can sense, even in the power saving mode, whether operation is performed on the operation panel 30, whether the communication portion 114 receives a communication request from the PC 500, and whether the USB memory 600 is connected to the connecting portion 115.

The power supply portion 130, in the power saving mode, limits the electric power supplied to the engine control portion 120 compared to in the normal mode (the supply of electric power to the engine control portion 120 is not completely stopped). Here, the engine control portion 120 does not perform arithmetic processing or the like and goes into a power saving state where it only takes in signals input to part of the terminals (interruption ports) of the CPU 121.

To the interruption ports of the CPU 121, different status signals of the plurality of sensing portions 40 are input. Thus, the engine control portion 120 can sense, even in the power saving mode, changes in the levels of the different status signals of the plurality of sensing portions 40.

In the power saving mode, when the signal level of any of the operation signal, the reception signal, and the connection signal changes (when a rising edge or a falling edge in the signal is sensed), the main control portion 110 returns from the power saving state to the normal state (the state where arithmetic processing can be performed). The main control portion 110 switches the electric power supply from the power supply portion 130 to the job executing portion 100J to the electric power supply expected in the normal mode as well as switches the electric power supply from the power supply portion 130 to the operation panel 30 to the electric power supply expected in the normal mode.

The main control portion 110 makes the engine control portion 120 return from the power saving state to the normal state (the state where arithmetic processing can be performed), and makes the engine control portion 120 perform prescribed preparation processing for controlling job execution by the job executing portion 100J. The engine control portion 120 performs, as the preparation processing, for example, processing for raising the fixing temperature to a predetermined temperature.

During the period of the power saving mode, when the signal level of any of the different status signals of the plurality of sensing portions 40 changes (when a rising edge or a falling edge in the signal is sensed), the engine control portion 120 returns from the power saving state to the normal state. Then, the engine control portion 120 notifies the main control portion 110 that the level of a status signal has changed. The main control portion 110, upon being so notified, returns from the power saving state to the normal state. The main control portion 110 and the engine control portion 120 perform predetermined processing. There is no particular limitation on what is performed as the predetermined processing during the period of the power saving mode.

For example, in during the period of the power saving mode, a user may supply sheets P to the sheet cassette CA. That is, the state of the multifunction peripheral 100 may change. Thus, the engine control portion 120 recognizes the current status of the multifunction peripheral 100 with respect to, for example, the remaining number of sheets P stored in the sheet cassette CA, and performs, as the predetermined processing, processing for sending apparatus information indicating the recognized status to the main control portion 110. The main control portion 110 performs, as the predetermined processing, for example, processing for storing apparatus information and processing for sending apparatus information to the PC 500. After the predetermined processing is completed, the main control portion 110 and the engine control portion 120 return to the power saving state.

Here, during the period of the power saving mode, when the signal level of any of different status signals of the plurality of sensing portions 40 changes, the engine control portion 120 sends signal level information that indicates the levels of the different status signals of the plurality of sensing portions 40 to the main control portion. The main control portion 110, upon receiving the signal level information, recognizes the level of the document set signal (the status signal which the document set sensing portion 40A outputs) that is indicated by the signal level information.

The main control portion 110 judges whether the level of the document set signal indicated by the signal level information is the first level or the second level. If, as a result, the document set signal level is found to be the first level, the main control portion 110 performs document identification processing for identifying whether the document D that is currently set on the document set tray 131 is the document D that has been set on the document set tray 131 at transition to the power saving mode (that is, a document D inadvertently left behind).

When the shift condition is met, the main control portion 110 makes the multifunction peripheral 100 shift to the power saving mode regardless of the level of the document set signal (even if a document is set on the document set tray 131). Thus, if the document set signal indicated by the signal level information is the first level, the multifunction peripheral 100 may have shifted to the power saving mode with the document D set on the document set tray 131 (a left-behind document D may be set on the document set tray 131).

The main control portion 110 judges, based on the result of document identification processing, whether the electric power supply from the power supply portion 130 to the operation panel 30 should be switched to the electric power supply expected in the normal mode (whether the setting screen 300 should be displayed in the operation panel 30). A more specific description will be given below with reference to the flow charts shown in FIGS. 4 and 5.

Figure 4:
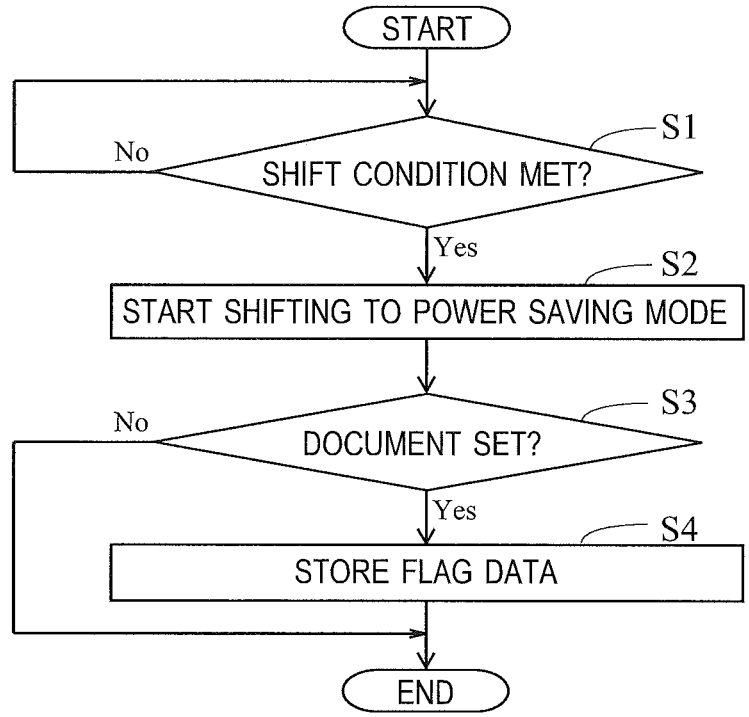
FIG. 4 A diagram showing a flow of processing performed when the multifunction peripheral according to the one embodiment of the present invention shifts to a power saving mode.

First, with reference to the flow chart shown in FIG. 4, processing that is performed at transition from the normal mode to the power saving mode in order to perform document identification processing will now be described.

In step S1, the main control portion 110 judges whether the shift condition for shifting to the power saving mode is met or not. Then, if the main control portion 110 judges that the shift condition is met, the process proceeds to step S2, and if the main control portion 110 judges that the shift condition is not met, the judgement in step S1 is repeated.

On proceeding to step S2, the main control portion 110 instructs the power supply portion 130 to start the shift to the power saving mode. In step S3, the main control portion 110 receives information indicating the level of the document set signal at transition to the power saving mode (for example, immediately before the shift to the power saving mode is completed) from the engine control portion 120 and judges whether the document D is set on the document set tray 131.

If, as a result, the main control portion 110 judges that the document D is set, the process proceeds to step S4. If the main control portion 110 judges that the document D is not set, this processing is terminated.

In step S4, the main control portion 110 stores in the EEPROM 113 store flag data that indicates that a document D is set on the document set tray 131 (that there is a left-behind document D). With this, if there is a left-behind document D, flag data is stored in the EEPROM 113, and if there is no left-behind document D, flag data is not stored in the EEPROM 113.

When the main control portion 110 receives signal level information from the engine control portion 120 after storing the flag data in the EEPROM 113 on transition to the power saving mode before the multifunction peripheral 100 returns to the normal mode, if the level of the document set signal indicated by the received signal level information is the second level, the main control portion 110 deletes flag data from the EEPROM 113. That is, if the multifunction peripheral 100 shifts to the power saving mode with the document D left behind on the document set tray 131, flag data is stored in the EEPROM 113, but if the left-behind document D is thereafter removed from the document set tray 131 during the period of the power saving mode, flag data is deleted from the EEPROM 113.

Figure 5:
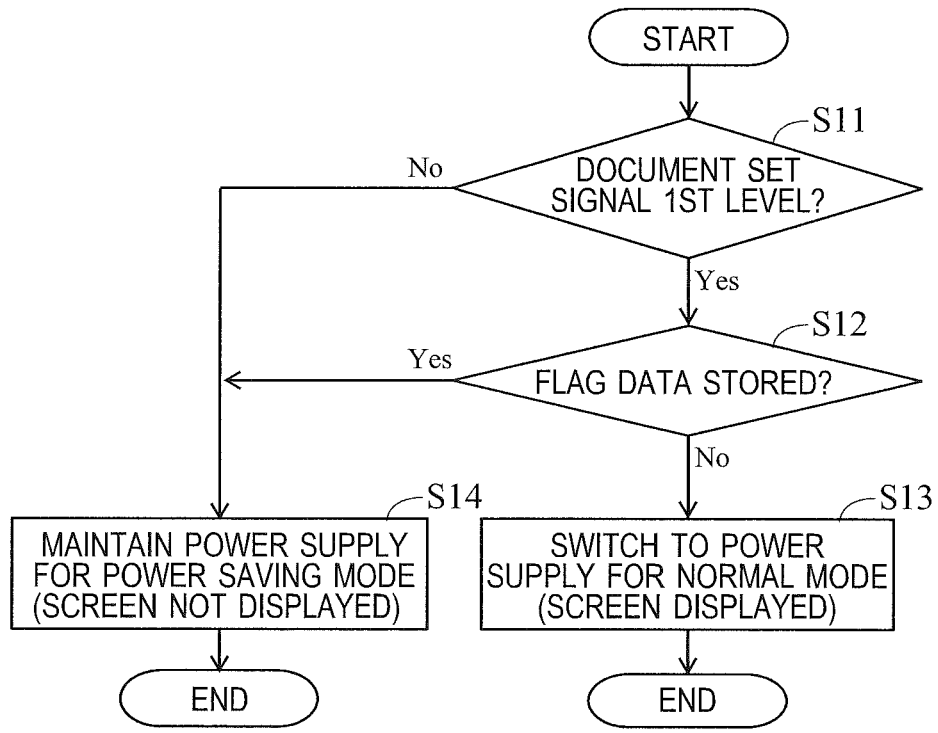
FIG. 5 A diagram showing a flow of processing performed when the multifunction peripheral according to the one embodiment of the present invention is in the period of the power saving mode.

Next, with reference to the flow chart shown in FIG. 5, processing that is performed during the period of the power saving mode will now be described. The flow chart shown in FIG. 5 starts when the engine control portion 120 senses that any of the status signals of the plurality of sensing portions 40 has changed during the period of the power saving mode, and the engine control portion 120 sends signal level information indicating the levels of the different status signals of the plurality of sensing portions 40 to the main control portion 110.

In step S11, the main control portion 110 judges whether the level of the document set signal indicated by the signal level information is the first level. If, as a result, the main control portion 110 judges that the level of the document set signal is the first level, the process proceeds to step S12.

In step S12, the main control portion 110 judges whether flag data is stored in the EEPROM 113. If, as a result, the main control portion 110 judges that flag data is not stored in the EEPROM 113, the process proceeds to step S13. That is, if the level of the document set signal is the first level and flag data is not stored in the EEPROM 113, the process proceeds to step S13.

In step S13, the main control portion 110 judges that the document D set on that document set tray 131 is not a left-behind document D. In this case, the main control portion 110 switches the electric power supply from the power supply portion 130 to the job executing portion 100J to the electric power supply expected in the normal mode as well as switches the electric power supply from the power supply portion 130 to the operation panel 30 to the electric power supply expected in the normal mode. The main control portion 110 makes the engine control portion 120 perform preparation processing. With this, the setting screen 300 is displayed on the operation panel 30, and it is then possible to perform setting related to a job (it becomes possible to instruct job execution). That is, the multifunction peripheral 100 returns to the normal mode.

On the other hand, if, in step S12, the main control portion 110 judges that flag data is stored in the EEPROM 113, the process proceeds to step S14. That is, even if the level of the document set signal is the first level, if flag data is stored in the EEPROM 113, the process proceeds to step S14.

In step S14, the main control portion 110 judges that the document D set on that document set tray 131 is a left-behind document D. In this case, the main control portion 110 maintains the electric power supply from the power supply portion 130 to the job executing portion 100J as the electric power supply expected in the power saving mode, as well as maintains the electric power from the power supply portion 130 to the operation panel 30 as the electric power supply expected in the power saving mode. Thus, the screen is not displayed on the operation panel 30. Here, the main control portion 110, together with the engine control portion 120, performs only predetermined processing. That is, the multifunction peripheral 100 does not return to the normal mode.

In step S11, also if the main control portion 110 judges that the level of the document set signal indicated by the signal level information is not the first level but is the second level, the process proceeds to step S14. That is, in this case, the multifunction peripheral 100 does not return to the normal mode (the screen is not displayed on the operation panel 30). Thus, for example, even if a left-behind document D is removed from the document set tray 131 during the period of the power saving mode, the multifunction peripheral 100 does not return to the normal mode. Also if, during the period of the power saving mode, the sheet cassette CA is attached or detached, or a document D is placed on the manual feed tray MT, or the access cover CV is opened or closed, the multifunction peripheral 100 does not return to normal mode.

In this embodiment, as described above, when the main control portion 110 shifts the multifunction peripheral 100 to the power saving mode, if the level of the document set signal is the first level, the main control portion 110 stores flag data that indicates that the document D is set on the document set tray 131 in the EEPROM 113. On the other hand, if the level of the document set signal is the second level, the main control portion 110 does not store flag data in the EEPROM 113.

If the level of any of the status signals of the plurality of sensing portions 40 changes during the period of the power saving mode, the engine control portion 120 sends the signal level information indicating the level of the different status signals of the plurality of sensing portions 40 to the main control portion 110. Upon receiving the signal level information from the engine control portion 120, the main control portion 110 recognizes the level of the document set signal indicated by the signal level information, and if the level of the document set signal is the first level and flag data is not stored in the EEPROM 113, switches the electric power supply from the power supply portion 130 to the operation panel 30 to the electric power supply expected in the normal mode. On the other hand, even if the level of the document set signal is the first level, if flag data is stored in the EEPROM 113, the main control portion 110 maintains the electric power supply from the power supply portion 130 to the operation panel 30 as the electric power supply expected in the power saving mode.

For example, assume the multifunction peripheral 100 shifts to the power saving mode with a left-behind document D set on the document set tray 131 (at this time, flag data is stored in the EEPROM 113), and then a user performs such a task with respect to the multifunction peripheral 100 as to change the level of a status signal of the sensing portion 40 other than the document set sensing portion 40A out of the plurality of sensing portions 40 (for example, attaching or detaching of the sheet cassette CA). Here, due to the left-behind document D being set on the document set tray 131, the level of the document set signal is the first level. However, flag data is stored in the EEPROM 113 and thus the electric power supply from the power supply portion 130 to the operation panel 30 is maintained as the electric power supply expected in the power saving mode (the operation panel 30 does not display a screen). This makes it possible to prevent the inconvenience where, when a user performs a task with respect to the multifunction peripheral 100 during the period of the power saving mode, a screen related to a job is unnecessarily displayed on the operation panel 30 due to a left-behind document D being set on the document set tray 131 even though the user does not intend to execute the job.

If the multifunction peripheral 100 shifts to the power saving mode with a left-behind document D not set on the document set tray 131 (at this time, flag data is not stored in the EEPROM 113) and then a user performs a task of setting the document D on the document set tray 131 intending to perform a job, with this task acting as a trigger, the setting screen 300 is displayed on the operation panel 30 for accepting setting operation related to the job. Thus, the user has only to set the document D on the document set tray 131 to immediately perform setting operation related to the job (without separately performing a task for displaying the screen 300 on the operation panel 30), and this is convenient for the user.

In this embodiment, when any of the status signals of the plurality of sensing portions 40 changes (when the signal level information is received from the engine control portion 120) during the period of the power saving mode, if the level of the document set signal is the second level, the main control portion 110 maintains the electric power supply from the power supply portion 130 to the operation panel 30 as the electric power supply expected in the power saving mode. This makes it possible to prevent the inconvenience where, when a user performs a task with respect to the multifunction peripheral 100 in the power saving mode, a screen is unnecessarily displayed on the operation panel 30 even though a document D is not set on the document set tray 131.

In this embodiment, when the main control portion 110 receives signal level information from the engine control portion 120 with flag data stored in the EEPROM 113 during the power saving mode, if the level of the document set signal indicated by the received signal level information is the second level, the main control portion 110 deletes flag data from the EEPROM 113. With this, it is possible, by removing a left-behind document D from the document set tray 131, to delete flag data from the EEPROM 113.

In this embodiment, by performing operation on the operation panel 30 or by inputting a job request to the multifunction peripheral 100 during the period of the power saving mode, it is possible to return the multifunction peripheral 100 to the normal mode (it is possible to display a screen related to a job on the operation panel 30).

The embodiments disclosed above should be understood to be in every aspect illustrative and not restrictive. The scope of the present invention is defined not by the description of the embodiments given above but by the appended claims, and should be understood to encompass any modifications made in the sense and scope equivalent to those of the claims.

The invention claimed is:

1. An image forming apparatus which has a normal mode and a power saving mode for suppressing electric power consumption compared to in the normal mode and which executes a job during the normal mode, the image forming apparatus comprising:
   a power supply portion for supplying electric power;
   an operation panel which, in the normal mode, displays a screen related to the job and accepts operation from a user and which, in the power saving mode, stops displaying the screen by being supplied from the power supply portion with suppressed electric power compared to in the normal mode;
   a document set portion on which a document is set if the job is a job involving document reading;
   a plurality of sensing portions which respectively output status signals that are signals with levels corresponding to status of the image forming apparatus, the sensing portions including a document set sensing portion which outputs, as the status signal, a document set signal whose signal level is a first level if the document is set on the document set portion and whose signal level is a second level if the document is not set on the document set portion;
   a control portion which controls the power supply portion and which senses the levels of the status signals; and
   a storing portion which stores data,
   wherein
   the control portion shifts the image forming apparatus to the power saving mode irrespective of the level of the document set signal when a shift condition prescribed as a condition for shifting the image forming apparatus to the power saving mode is met during a period of the normal mode,
   when shifting the image forming apparatus to the power saving mode, the control portion stores in the storing portion flag data indicating that the document is set on the document set portion if the level of the document set signal is the first level but does not store the flag data in the storing portion if the level of the document set signal is the second level, and
   when the level of any of the status signals from the plurality of sensing portions changes during a period of the power saving mode,
   if the level of the document set signal is the first level and the flag data is not stored in the storing portion, the control portion switches electric power supply from the power supply portion to the operation panel to the electric power supply expected in the normal mode,
   even if the level of the document set signal is the first level, if the flag data is stored in the storing portion, the control portion maintains the electric power supply from the power supply portion to the operation panel as the electric power supply expected in the power saving mode, and
   if the level of the document set signal is the second level, the control portion maintains the electric power supply from the power supply portion to the operation panel as the electric power supply expected in the power saving mode.

2. The image forming apparatus according to claim 1, wherein
during the period of the power saving mode, when the level of the document set signal changes to the second level with the flag data stored in the storing portion, the control portion deletes the flag data.

3. The image forming apparatus according to claim 1, wherein
the control portion includes
a first control portion which controls the power supply portion and the operation panel and a second control portion which is connected to the plurality of sensing portions, during the period of the power saving mode, when the level of any of the status signals of the plurality of sensing portions changes, the second control portion sends to the first control portion signal level information indicating the levels of the different status signals of the plurality of sensing portions, and upon receiving the signal level information, the first control portion recognizes the level of the document set signal indicated by the signal level information and if the level of the document set signal is the first level and the flag data is not stored in the storing portion, the first control portion switches the electric power supply from the power supply portion to the operation panel to the electric power supply expected in the normal mode and, even if the level of the document set signal is the first level, if the flag data is stored in the storing portion, the first control portion maintains the electric power supply from the power supply portion to the operation panel as the electric power supply expected in the power saving mode.

4. The image forming apparatus according to claim 3, wherein the first control portion, during the period of the power saving mode, when operation is performed on the operation panel, switches the electric power supply from the power supply portion to the operation panel to the electric power supply expected in the normal mode.

5. The image forming apparatus according to claim 3, further comprising an input portion to which a Job request for requesting job execution is input from an external device, wherein the first control portion, during the period of the power saving mode, when the job request is input, switches the electric power supply from the power supply portion to the operation panel to the electric power supply expected in the normal mode.

* * * * *